(12) United States Patent
Dang et al.

(10) Patent No.: US 10,947,693 B2
(45) Date of Patent: Mar. 16, 2021

(54) REINFORCED LID FOR SUBGRADE ENCLOSURES

(71) Applicant: Oldcastle Infrastructure, Inc., Atlanta, GA (US)

(72) Inventors: Nguyen Thai Dang, Churchable (AU); Mike Collins, Folsorn, CA (US)

(73) Assignee: Oldcastle Infrastructure, Inc., Atlanta, GA (US)

( * ) Notice: Subject to any disclaimer, the term of this patent is extended or adjusted under 35 U.S.C. 154(b) by 51 days.

(21) Appl. No.: 16/372,079

(22) Filed: Apr. 1, 2019

(65) Prior Publication Data

US 2019/0301127 A1  Oct. 3, 2019

Related U.S. Application Data (60) Provisional application No. 62/651,027, filed on Mar. 30, 2018.

(51) Int. Cl.
| | | |
|---|---|---|
| *E02D 29/14* | (2006.01) | |
| *B65D 43/02* | (2006.01) | |
| *E04C 5/07* | (2006.01) | |
| *E04C 5/20* | (2006.01) | |
| *H02G 9/10* | (2006.01) | |

(52) U.S. Cl.
CPC .............. *E02D 29/14* (2013.01); *B65D 43/02* (2013.01); *E04C 5/07* (2013.01); *E04C 5/20* (2013.01); *B65D 2543/00101* (2013.01); *B65D 2543/00314* (2013.01); *H02G 9/10* (2013.01)

(58) Field of Classification Search
CPC ... B65F 1/1447; E05B 65/006; B65D 51/243; B65D 43/02; B65D 2543/00101; B65D 2543/00314; E02D 29/1427; E02D 29/14; E04C 5/07; H02G 9/10; H02G 3/185; H02G 3/081
USPC ........................................................ 220/484
See application file for complete search history.

(56) References Cited

U.S. PATENT DOCUMENTS

| | | |
|---|---|---|
| 469,501 A | 2/1892 | Fowler |
| 694,455 A | 3/1902 | Barker |
| 2,109,287 A | 2/1938 | Elkington |
| 2,194,221 A | 3/1940 | Elkington |
| 2,211,513 A | 8/1940 | Nagin |

(Continued)

FOREIGN PATENT DOCUMENTS

| | | |
|---|---|---|
| EP | 0529178 | 3/1993 |
| GB | 2232182 | 5/1990 |
| JP | H06-49857 | 2/1994 |

OTHER PUBLICATIONS

"Snap-Fit Joints for Plastics—A Design guide" Bayer MaterialScience LLC, Nov. 2005, 26 pages.

(Continued)

*Primary Examiner* — Shawn M Braden
(74) *Attorney, Agent, or Firm* — Sheridan Ross P.C.

(57) ABSTRACT

In various embodiments, lids for an in-ground or subgrade vault is provided. In various embodiments, lids are provided with a plastic reinforcement structure and concrete. The plastic reinforcement structure includes one or more plastic sidewalls that protect the edges of the lid from damage. An internal reinforcement structure comprises receiving members for receiving, securing, and positioning rebar members that are cast in place in a finished product.

17 Claims, 6 Drawing Sheets

(56) References Cited

U.S. PATENT DOCUMENTS

| | | |
|---|---|---|
| 2,274,108 A | 2/1942 | Tripp |
| 2,275,105 A | 3/1942 | Greulich |
| 2,959,633 A | 11/1960 | Palmer et al. |
| 3,046,853 A | 7/1962 | Legendre |
| 3,263,853 A | 8/1966 | Smith |
| 3,544,417 A | 12/1970 | Corzine |
| 3,839,768 A | 10/1974 | McQuestion |
| 3,920,347 A | 11/1975 | Sauriol et al. |
| 3,952,908 A | 4/1976 | Carson |
| 3,974,599 A | 8/1976 | Grosh |
| 4,065,020 A | 12/1977 | Carson |
| 4,163,503 A | 8/1979 | McKinnon |
| 4,438,859 A | 3/1984 | Solek |
| 4,567,697 A | 2/1986 | Hahne |
| 4,614,009 A | 9/1986 | Boots |
| 4,662,777 A | 5/1987 | Newton |
| 4,726,707 A | 2/1988 | Newton |
| 4,861,186 A | 8/1989 | Ferns |
| 4,973,191 A | 11/1990 | Dannhauser |
| 5,084,596 A | 1/1992 | Borsh et al. |
| 5,123,776 A | 6/1992 | Lang et al. |
| 5,197,307 A * | 3/1993 | Abbott, Jr. ............ E05B 65/006 52/220.1 |
| 5,312,202 A | 5/1994 | Newton |
| 5,378,078 A | 1/1995 | Lewis et al. |
| 5,383,311 A | 1/1995 | Strickland |
| 5,462,383 A | 10/1995 | Van 'T Veer |
| 5,470,172 A | 11/1995 | Wiedrich |
| 5,486,066 A | 1/1996 | Hagenah |
| 5,511,345 A | 4/1996 | Jones et al. |
| 5,529,431 A | 6/1996 | Walsh |
| 5,588,775 A | 12/1996 | Hagenah |
| 5,609,680 A | 3/1997 | Kobayashi et al. |
| 5,611,125 A | 3/1997 | Williams et al. |
| 5,614,009 A | 3/1997 | Kobayashi et al. |
| 5,624,615 A | 4/1997 | Sandorff |
| 5,632,571 A | 5/1997 | Mattox |
| 5,726,385 A | 3/1998 | Lowery et al. |
| 5,829,215 A | 11/1998 | Billing |
| 5,842,811 A | 12/1998 | Johnson |
| 5,966,876 A | 10/1999 | Neathery et al. |
| 6,143,168 A | 11/2000 | Shackelford |
| 6,267,531 B1 | 7/2001 | Clarke |
| 6,281,439 B1 | 8/2001 | Reiker |
| 6,457,901 B1 | 10/2002 | Sondrup |
| 6,531,059 B1 | 3/2003 | Morris et al. |
| RE38,120 E | 5/2003 | Bordwell et al. |
| 6,595,716 B1 | 7/2003 | VanDeVyvere et al. |
| 6,655,093 B1 | 12/2003 | Gavin |
| 6,688,807 B2 | 2/2004 | Navarrete |
| 6,739,797 B1 | 5/2004 | Schneider |
| 6,772,566 B1 | 8/2004 | Machledt et al. |
| 6,881,899 B1 | 4/2005 | Trangsrud |
| 6,899,240 B2 | 5/2005 | Dang et al. |
| 6,932,099 B2 * | 8/2005 | Mahaney ............ H02G 9/10 137/15.08 |
| 6,968,969 B1 | 11/2005 | McKinnon, Jr. |
| 7,004,677 B1 | 2/2006 | Ericksen et al. |
| 7,144,189 B1 | 12/2006 | Bongiovanni et al. |
| 7,163,352 B2 | 1/2007 | Jurich et al. |
| 7,225,595 B2 | 6/2007 | Bienick et al. |
| 7,361,834 B1 | 4/2008 | Trangsrud et al. |
| 7,385,137 B2 | 6/2008 | Burke et al. |
| 7,467,910 B2 | 12/2008 | Lecuyer et al. |
| 7,581,655 B1 | 9/2009 | Trangsrud |
| 7,619,878 B1 | 11/2009 | Cook |
| 7,748,926 B2 | 7/2010 | Jurich et al. |
| 7,883,290 B1 | 2/2011 | Ross et al. |
| 7,914,227 B2 | 3/2011 | Jordan et al. |
| 7,931,421 B2 | 4/2011 | Rathmann et al. |
| 8,061,928 B2 | 11/2011 | Jurich et al. |
| 8,118,517 B2 | 2/2012 | Kelley et al. |
| D662,323 S | 6/2012 | Jurich et al. |
| 8,342,354 B2 | 1/2013 | Letica |
| D682,553 S | 5/2013 | Jurich et al. |
| 8,444,003 B2 | 5/2013 | Chen |
| 8,469,628 B2 | 6/2013 | Miller et al. |
| 8,534,484 B2 | 9/2013 | Rost et al. |
| 8,821,062 B2 | 9/2014 | Miller et al. |
| 8,827,589 B2 | 9/2014 | Jurich et al. |
| 8,835,757 B2 | 9/2014 | Freeman |
| 9,284,711 B2 | 3/2016 | Jurich et al. |
| 9,435,099 B2 | 9/2016 | Dang |
| 1,013,205 A1 | 11/2018 | Dang et al. |
| 2002/0136604 A1 | 9/2002 | Sondrup |
| 2002/0136605 A1 | 9/2002 | Sondrup |
| 2003/0082000 A1 | 5/2003 | Sondrup |
| 2004/0118066 A1 | 6/2004 | DeLoach |
| 2010/0329782 A1 * | 12/2010 | Miller ............ E02D 29/1454 404/25 |
| 2012/0073106 A1 | 3/2012 | Jurich et al. |
| 2012/0079783 A1 * | 4/2012 | Nylin ............ E04B 2/30 52/309.1 |
| 2016/0265228 A1 * | 9/2016 | Smith ............ B28B 23/18 |
| 2016/0290035 A1 * | 10/2016 | Boss ............ E02D 29/14 |
| 2016/0369474 A1 * | 12/2016 | Dang ............ E05B 65/006 |

OTHER PUBLICATIONS

Official Action for U.S. Appl. No. 15/456,753, dated Oct. 5, 2017, 6 pages. Restriction Requirement.

Official Action for U.S. Appl. No. 15/456,753, dated Dec. 29, 2017, 6 pages.

Notice of Allowance for U.S. Appl. No. 15/456,753, dated Aug. 6, 2018, 8 pages.

Official Action for U.S. Appl. No. 12/494,105, dated Apr. 14, 2011, 10 pages.

Official Action for U.S. Appl. No. 12/494,105, dated Dec. 13, 2011, 12 pages.

Notice of Allowance for U.S. Appl. No. 12/494,105, dated Feb. 28, 2013, 12 pages.

Official Action for U.S. Appl. No. 13/911,008, dated Aug. 1, 2013, 8 pages.

Official Action for U.S. Appl. No. 13/911,008, dated Jan. 16, 2014, 9 pages.

Notice of Allowance for U.S. Appl. No. 13/911,008, dated Apr. 25, 2014, 6 pages.

* cited by examiner

REINFORCED LID FOR SUBGRADE ENCLOSURES

CROSS-REFERENCE TO RELATED APPLICATIONS

This application claims priority under 35 U.S.C. § 119(e) to U.S. Provisional Patent Application Ser. No. 62/651,027 filed Mar. 30, 2018, which is incorporated herein in its entirety by reference.

FIELD

The present disclosure relates generally to closures for underground housings having surface access openings. More specifically, embodiments of the present disclosure relate to reinforced lids or similar coverings for underground utility vaults, housings and other enclosures.

BACKGROUND

Utilities of various types are commonly buried underground. Such utilities include, for example, water, sewer, natural gas, telephone, cable television, irrigation, electric service, security and fire alarm service. Underground utilities commonly employ an access portal to allow service personnel to access the utilities for maintenance and meter reading. This access portal typically includes a pre-cast concrete box that is buried underground. Utility devices, such as valve mains, meters and wire connectors, are located within the concrete box. The box includes an opening through which the utility devices are accessed. When the box is not being accessed, the opening is covered by a lid. The lid and box are located such that the lid is flush, or nearly flush, with the level of the surrounding ground. The lid is typically made of pre-cast concrete or composite resin. The lid can include a lip that is shaped to engage the opening in the box. Alternatively, the opening of the box can be shaped to receive the lid, which does not have a lip.

A common configuration is a lid having tapered sidewalls, and a box having an opening with corresponding tapered sidewalls. In this configuration, the lid easily slides into the opening of the box and fixes itself firmly in place as the tapering sidewalls of the lid engage the tapering sidewalls of the opening. This design is relatively inexpensive to form and is fairly robust, compared with more complicated closures.

While the concrete lids and boxes are quite strong, these lids tend to be heavy, and repeated opening of the box causes wear or damage. Handling lid when opening and closing the box is cumbersome and can lead to mishandling of the lid. As the edges of the lid strike the edges of the box opening (or the ground), the concrete can chip or fracture on either one or both of the lid and the box. Over time, the lid may sustain too much damage to function properly, thereby requiring replacement of the lid. The box may also eventually reach a point where it must be replaced, as a result of damage to the opening therein. Replacement of the box can be costly and labor intensive, requiring the breaking of pavement in those cases where the box is under pavement. At the very least, the box must be excavated and replaced with a new box. Plastic lids are fragile and warp over time and can easily be pried open—thus a more robust and cost effective reinforced lid is needed.

SUMMARY

Systems, apparatuses, and methods are provided to reinforce a lid for a utilities vault and reduce distortion of the shape of the lid over time. Features such as a reinforcement structure and rebar members can support a sidewall of a lid to reinforce the sidewall. These features can also complement a manufacturing process where concrete is poured into an internal volume of the lid. For instance, receiving members on the sidewall and the reinforcement structure can receive, support, retain, and/or align at least one rebar member to be cast-in-place when a concrete portion of the lid is poured. The sidewall and the reinforcement structure may be a continuous structure made from plastic or resin in some embodiments.

In one embodiment, a lid is provided that comprises a ring member or housing having at least one sidewall and at least partially defining an internal volume of the lid. A cover is provided on an upper end of the at least one sidewall. A reinforcement structure extends interior to the sidewall. The reinforcement structure comprises at least one receiving slot for selectively receiving a rebar member. In some embodiments, the lid further comprises at least one rebar member provided in communication with the reinforcement structure and embedded in a volume of concrete.

Although certain embodiments of the present disclosure contemplate a cover member provided with a housing, alternative embodiments contemplate that a lid is provided without a cover member. For example, in some embodiments, a lid is provided that comprises a housing having at least one sidewall and wherein a volume of concrete is provided within the housing. Although various housings of the present disclosure are contemplated as being rectangular or substantially rectangular (i.e. have rounded edges or are otherwise not perfect rectangles), alternative housing shapes are contemplated such as cylindrical or circular rings and various polygonal rings. Lids of some embodiments of the present disclosure are contemplated that are formed without a cover and wherein the housing is provided on a formwork, concrete is poured into the housing, and the concrete is allowed to cure. The resulting product of this method comprises a lid with an outer sidewall or perimeter formed by the housing and concrete upper and lower surfaces.

In various embodiments, lids are provided comprising a reinforcement member that is operable to provide structural support to the lid and that is further operable to receive at least one rebar member. The housing and/or reinforcement member are contemplated as comprising receiving members or slots or cradle members for receiving at least a portion of a diameter of a rebar member. In further embodiments, it is contemplated that a lid comprises apertures through which rebar members or other supports are inserted or threaded and received therein. Accordingly, lids of the present disclosure provide for at least one rebar member that is positioned and cast within an internal volume of concrete and within a lid. In some embodiments, reinforcement members are provided and arranged to center and align rebar members within the lid. Certain embodiments of the present disclosure comprise receiving members with snap-fit or snap in place features to selectively receive rebar.

In some embodiments, lids are provided that comprise one or more features to selectively retain a rebar element and are devoid of a plastic reinforcing structure. Although some embodiments of the present disclosure contemplate the provision of a reinforcing structure extending between portions of a lid in combination with rebar and/or rebar receiving members, additional embodiments contemplate lids that are devoid of a reinforcing structure. In such embodiments, lids are operable to selectively receive one or more rebar members that operate to provide reinforcement and structural stability to the lid. For example, in one embodiment, a lid is provided that comprises a perimeter or sidewall having a height. An interior of the sidewall comprises at least one receiving member in the form of a shoulder, a notch, an aperture, a cradle, and a slot to selectively receive a rebar member and wherein the rebar members extends along a width and/or a length of the lid. Preferably, the lid comprises a second receiving member to receive an opposing end of the rebar member. In such embodiments, one or more rebar members may be selectively inserted into the lid to provide a desired resulting structure.

In further embodiments, it is contemplated that lids are provided that comprise a reinforcing member and at least one receiving member for rebar, and wherein the reinforcing member comprises a selectively removable or insertable member. In certain embodiments, it is contemplated that reinforcing members are co-formed or otherwise integral with the perimeter or sidewall of the lid. In alternative embodiments, however, it is contemplated that such reinforcing members are selectively removable and insertable. In such embodiments, end portions of the reinforcing member(s) may be slid or otherwise inserted into receiving portions on the sidewall(s). Rebar members of the present disclosure can extend in various directions, including along the length of a lid, across a width of the lid, and at various angles thereto.

In various embodiments, methods of forming a lid are provided. In one embodiment, a method is provided comprising the steps of: providing a housing with a plurality of sidewalls and a reinforcement structure extending between at least two of the plurality of sidewalls, and wherein at least one of the sidewalls and the reinforcement structure comprises a receiving member such as a slot or aperture for selectively receiving a rebar member; providing a rebar member such that the rebar member is at least partially received within the receiving member; providing a quantity of uncured concrete to the member such that the rebar member is surrounded by the concrete; and allowing the concrete to cure to form a lid with a reinforcement structure and at least one rebar member within a concrete portion of the lid.

One particular embodiment of the disclosure is a lid for a utilities vault, comprising a substantially planar cover having a perimeter edge; a housing at least partially defined by at least one sidewall extending from the perimeter edge of the planar cover, the housing having an upper end and a lower end, and the at least one sidewall having an inner surface with a first location and a second location that define an inner diameter of the housing; a first receiving member extending inward from the inner surface at the first location, the first receiving member having a first shoulder face oriented towards the lower end of the housing; a second receiving member extending inward from the inner surface at the second location, the second receiving member having a second shoulder face oriented towards the lower end of the housing; and a rebar member positioned between the upper end and the lower end of the housing, the rebar member having a first end positioned on the first shoulder face and a second end positioned on the second shoulder face, the rebar member having a length that is substantially the same as the inner diameter of the housing to reinforce the at least one sidewall.

In some embodiments, the lid further comprises a reinforcement structure extending between two sidewalls of the at least one sidewall, wherein the reinforcement structure has a third receiving member having a third shoulder face oriented towards the upper end of the housing, wherein the rebar member is positioned on the third shoulder face. In various embodiments, the at least one sidewall comprises a first sidewall and a second sidewall, wherein the first location and the first receiving member are positioned on the first sidewall, and the second location and the second receiving member are positioned on the second sidewall.

In some embodiments, the lid further comprises a third sidewall and a fourth sidewall of the at least one sidewall, wherein the third sidewall has a third location and the fourth sidewall has a fourth location, and the third location and the fourth location define a second inner diameter of the housing; a third receiving member extending inward from the inner surface at the third location, the third receiving member having a third shoulder face oriented towards the lower end of the housing; a fourth receiving member extending inward from the inner surface at the fourth location, the fourth receiving member having a fourth shoulder face oriented towards the lower end of the housing; and a second rebar member positioned between the upper end and the lower end of the housing, and the second rebar member having one end positioned on the third shoulder face and another end positioned on the fourth shoulder face, and a length of the second rebar member is substantially the same as the second inner diameter of the housing to reinforce the at least one sidewall. In various embodiments, the rebar member and the second rebar member are oriented substantially perpendicular to each other, and wherein the inner diameter is a width of the housing, the second inner diameter is a length of the housing, and the length is greater than the width. In some embodiments, the lid further comprises a third rebar member having a length that is longer than the inner diameter of the housing, wherein the third rebar member has at least one bend along the length of the third rebar member, and the third rebar member is positioned between the upper end and the lower end of the housing.

In various embodiments, the length of the rebar member and the inner diameter of the housing have a less than 2% relative difference. In some embodiments, the lid further comprises a cementitious material positioned between the upper end and the lower end of the housing, wherein the first receiving member, the second receiving member, and the rebar member are embedded in the cementitious material.

Another particular embodiment of the present disclosure is a lid for a utilities vault, comprising a housing defined by a first sidewall and a second sidewall that extend from an upper end to a lower end of the housing, wherein the housing has an interior shoulder positioned on each of the first and second sidewalls with a geometric profile that receives a rebar member; the rebar member having one end positioned on the interior shoulder of the first sidewall and another end positioned on the interior shoulder of the second sidewall; a cover interconnected to the upper end of the housing, wherein the cover and the housing define an internal volume; and a fill material positioned in the internal volume, wherein the rebar member is embedded in the fill material to reinforce the first sidewall and the second sidewall.

In some embodiments, the geometric profile of the interior shoulder of the first and second sidewalls defines a volume that at least partially receives a cross-section of the rebar member. In various embodiments, the geometric profile of the interior shoulder of the first and second sidewalls is oriented toward the lower end of the housing. In some embodiments, the geometric profile of the interior shoulder of the first and second sidewalls is a curved surface having a radius of curvature that is equal to or greater than a radius of a cross-section of the rebar member.

In various embodiments, the lid further comprises a reinforcement structure having a plurality of ribs extending between the first sidewall and the second sidewall, wherein the reinforcement structure has an interior shoulder with a geometric profile that receives the rebar member. In some embodiments, the reinforcement structure has a longitudinal rib that is substantially perpendicular to the plurality of ribs, and the interior shoulder is positioned on the longitudinal rib. In various embodiments, the first sidewall, the second sidewall, and the reinforcement structure are a continuous structure. In some embodiments, the first sidewall, the second sidewall, and the reinforcement structure are a plastic material. In various embodiments, the fill material is at least of a cementitious material, a plastic material, or an insulation material.

Yet another particular embodiment of the present disclosure is a method of forming a reinforced concrete lid for a utilities vault, comprising (i) providing a planar cover having an inner surface and an outer surface; (ii) providing a plurality of sidewalls extending from the inner surface of the planar cover such that the plurality of sidewalls and the planar cover define an internal volume, the plurality of sidewalls having an inner surface with opposing shoulders for receiving a rebar member positioned between the inner surface of the planar cover and a distal end of the plurality of sidewalls; (iii) supporting the outer surface of the planar cover such that the plurality of sidewalls extend upwardly from the planar cover; (iv) positioning one end of the rebar member on one shoulder of the opposing shoulders and another end of the rebar member on another shoulder of the opposing shoulders; and (v) pouring a cementitious material into the internal volume such that the rebar member is embedded in the cementitious material.

In some embodiments, the plurality of sidewalls extend from the planar cover by a predetermined distance, and the ends of the rebar member are positioned at approximately a midpoint along the predetermined distance. In various embodiments, the method further comprises (vi) screeding the cementitious material such that the cementitious material is flush with the distal end of the plurality of sidewalls.

To comply with the written description requirement under 35 U.S.C. § 112, the following U.S. Patents related to utilities access closures are hereby incorporated by reference in their entireties: U.S. Pat. No. 7,163,352 to Jurich et al., U.S. Pat. No. 7,748,926 to Jurich et al., U.S. Pat. No. 8,061,928 to Jurich et al., U.S. Pat. No. 8,827,589 to Jurich et al., U.S. Pat. No. 9,284,711 to Jurich et al. Various features of the aforementioned patents are contemplated for use with embodiments of the present disclosure. For example, lids with internal plastic reinforcement members are contemplated. Such existing technologies, however, fail to teach or disclosure novel aspects of the present disclosure including, but not limited to, devices, methods and systems for receiving, securing and providing one or more metal reinforcing bar members within a lid.

The Summary is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
| --- | --- |
| 10 | Lid |
| 12 | Housing |
| 13 | Sidewall |
| 14 | Cover |
| 16 | Interior Volume |
| 18 | Reinforcement Structure |
| 20 | Rebar Member |
| 22 | Access Port |
| 24 | Access Port |
| 26 | Receiving Member |
| 28 | Receiving Member |
| 30 | Second Receiving Member |
| 32 | Second Receiving Member |
| 33 | Shoulder |
| 34 | Lid Width |
| 35 | Receiving Volume |
| 36 | Lid Length |
| 38 | Projection |
| 40 | Surface Feature |
| 42 | Lid |
| 44 | Housing |
| 46 | Rebar |
| 48 | Rebar |
| 50 | End |
| 52 | End |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present invention are described herein and as depicted in the drawings. It is expressly understood that although the figures depict vaults, lids, and thermoplastic blends, and methods and systems for using the same, the present invention is not limited to these embodiments. Further, some terms may be used interchangeably, for example, "subgrade utility vault," "utility vault," and "vault" may be used interchangeably. Lastly, it will be appreciated that the term substantially can indicate a 0% to 5% relative difference, and/or the term substantially can indicate a less than 2% relative difference. In addition, the term approximately can indicate a less than 10% relative difference.

Figure 1:
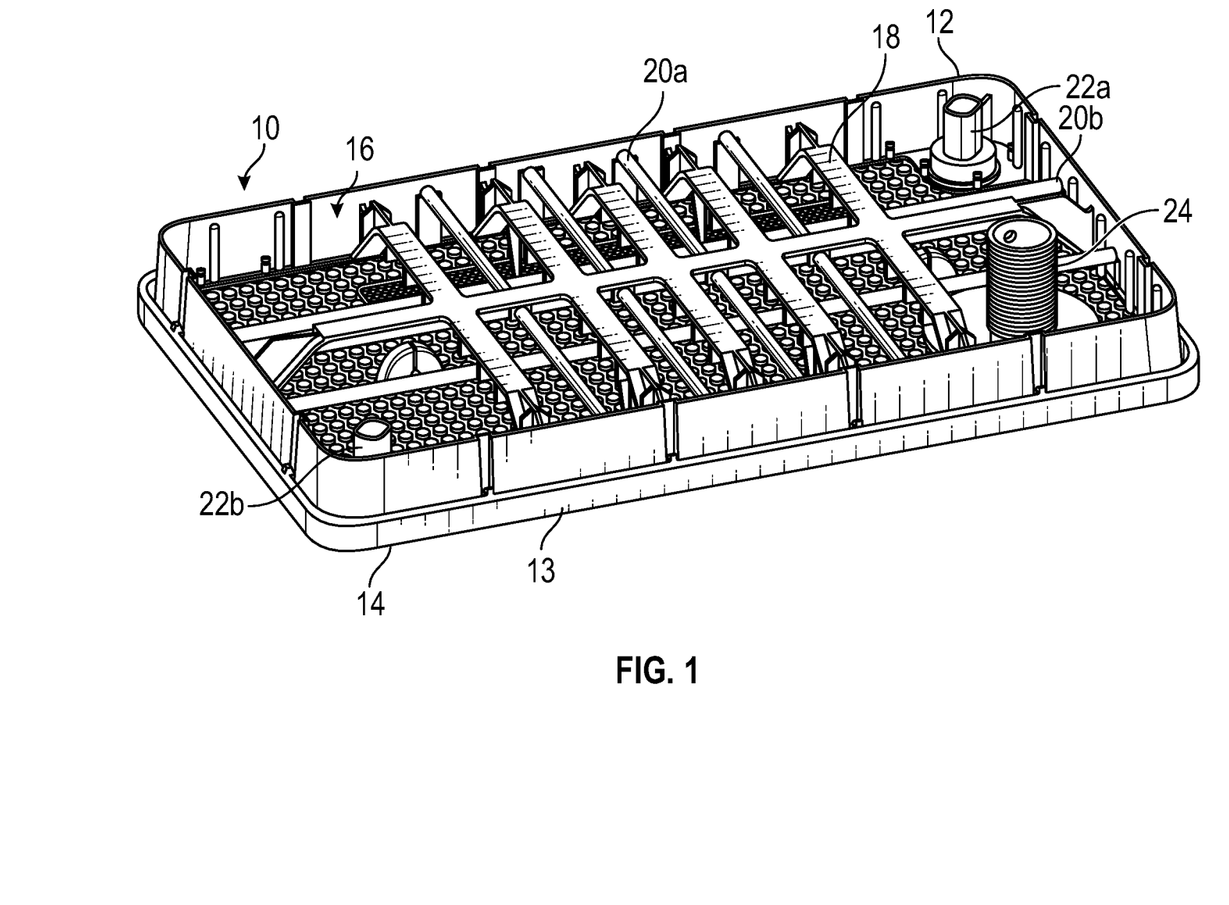
FIG. 1 is a bottom perspective view of a lid according to one embodiment of the present disclosure.

FIG. 1 is a bottom perspective view of a lid 10 according to one embodiment of the present disclosure. As shown, the lid 10 comprises a ring member or housing 12 and a cover portion 14. Sidewalls extending from the cover 14 or top end of the housing 12 generally define a perimeter of the lid 10 and comprises a height or thickness. The housing 12 is contemplated as comprising molded plastic in various embodiments. Collectively, the housing 12 and the cover 14 provide for a lid that is operable to communicate with and cover or seal at least an upper end of a vault or closure (not shown in FIG. 1). Lids of the present disclosure are contemplated for use with various vaults and closures including, but not limited to, plastic vaults, concrete vaults, metal vaults, and various combinations thereof. In at least some embodiments, lids of the present disclosure are contemplated for use with precast concrete subgrade vaults for utilities access and the like. It will be recognized, however, that various novel features, aspects, and benefits of the present disclosure are not tied to the ultimate use or intended purpose of the lid.

As further shown in FIG. 1, an interior volume 16 is provided and generally defined by the dimensions of the housing 12 and an underside of the cover 14. The interior volume 16 is intended to receive a volume of concrete. For illustration purposes, the lid 10 of FIG. 1 is provided without concrete and various components of the lid 10 are shown. For example, the lid 10 comprises an internal reinforcement structure 18 comprising a plurality of ribs. The ribs of the reinforcement structure 18 extend in a length and width direction of the lid. The internal reinforcement structure 18 of the lid provides structural stability to the housing member 12, provides contacts points for communicating with concrete, and comprises a plurality of receiving members as will be shown and described herein. The receiving members are operable to receive, orient, and/or stabilize rebar members 20a, 20b. The rebar members or bars are intended to be encased within a portion of concrete when lid assembly and manufacture is completed to reinforce the concrete and sidewalls 13 of the lid 10. Access ports 22a, 22b, 24 are provided to allow for access to an enclosed lid and vault combination. For example, access ports may provide access to locking elements intended to be located subgrade. Preferably, the members are centered in a height direction of the lid for strength purposes.

Figure 2:
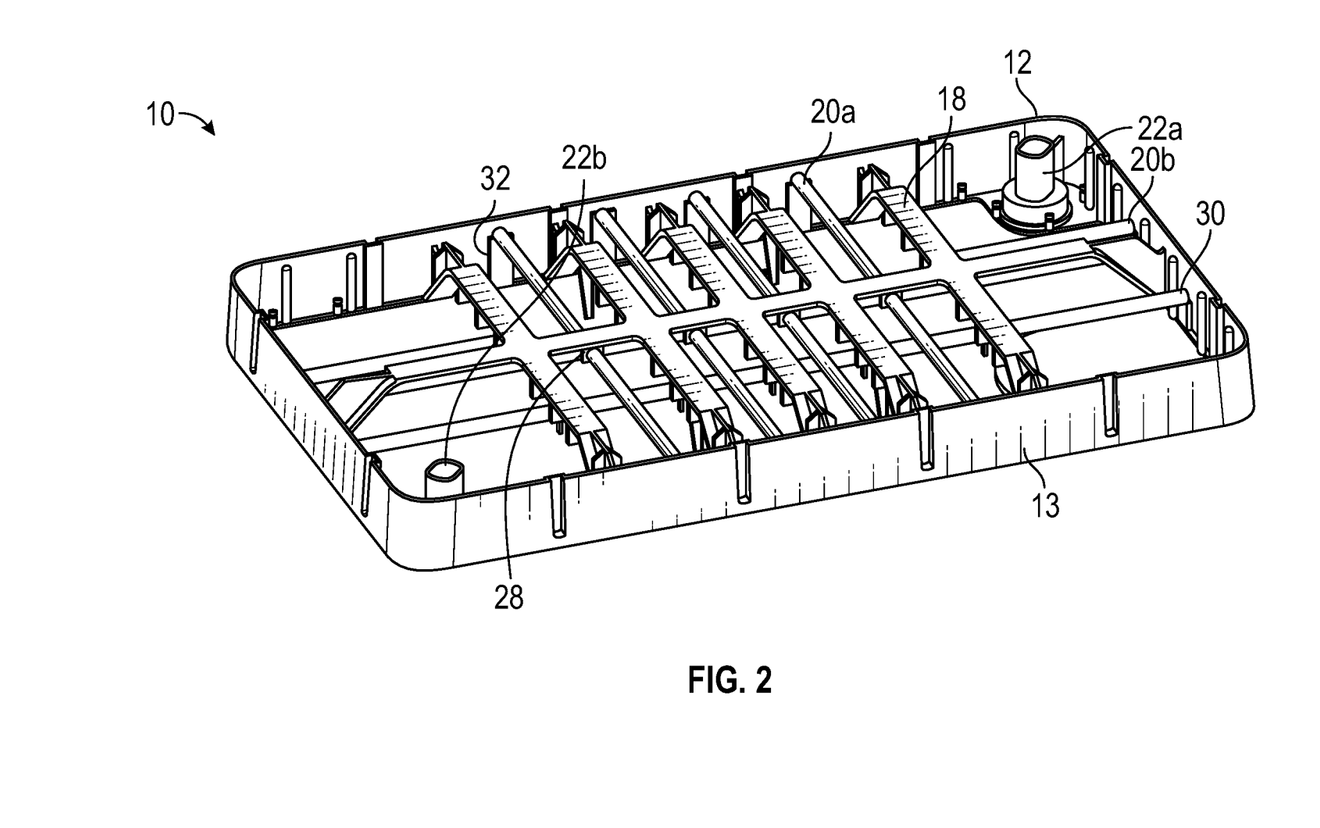
FIG. 2 is a bottom perspective view of a portion of a lid according to the embodiment of FIG. 1.
Figure 3:
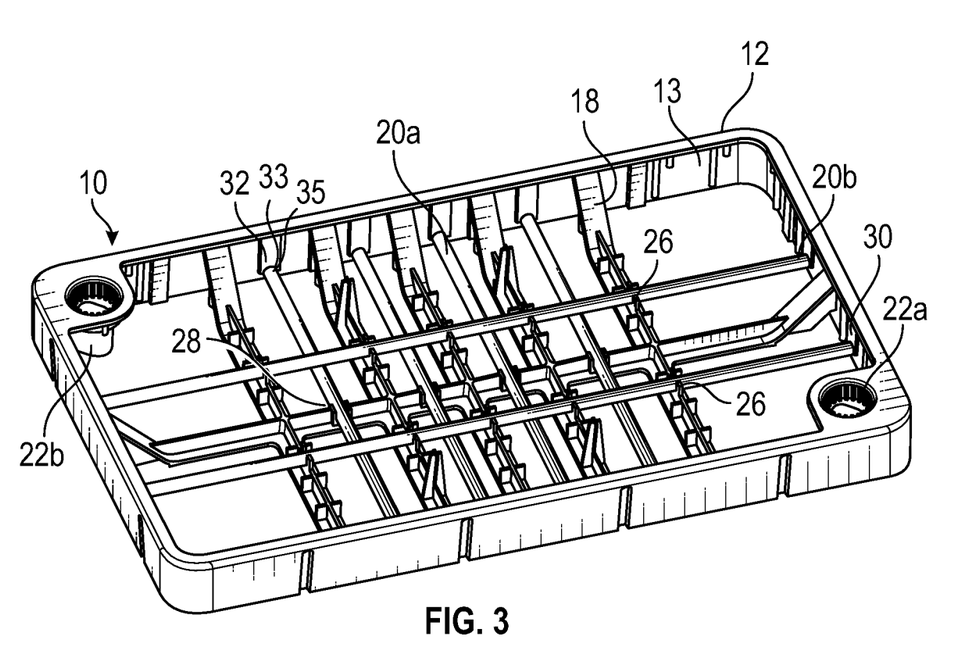
FIG. 3 is a top perspective view of the portion of a lid according FIG. 2.

FIGS. 2-3 are top and bottom perspective views of the lid 10 of FIG. 1, respectively, and wherein the cover 14 is omitted for illustrative purposes. As shown, the lid 10 comprises a housing 12 generally providing a perimeter of the lid. An internal reinforcement structure 18 is provided within the housing 12. In various embodiments, it is contemplated that the housing 12 and the internal reinforcement structure 18 are formed as a unitary structure (e.g. a single molded plastic component). In alternative embodiments, it is contemplated that the internal reinforcement structure 18 is formed as one or more separate components and inserted or installed within the housing 12. For example, it is contemplated that the internal reinforcement structure 18 may be slid or snap-fit into place within the housing 12.

A plurality of rebar members 20a, 20b are provided. The rebar members are supported by at least one of the internal reinforcement structure 18 and an inner surface of the housing 12. As shown in the embodiment of FIG. 2, the rebar members 20a, 20b are received by and supported the internal reinforcement structure 18. The internal reinforcement structure 18 comprises a plurality of receiving members 26, 28 for selectively receiving rebar members. In at least some embodiments, the receiving members 26, 28 comprise shoulders and/or partially open troughs or slots to receive the width or diameter of a segment of rebar. Stated differently or alternatively, the receiving member 26, 28 may have a shoulder surface that defines a receiving volume of the receiving member 26, 28. In addition, the shoulder surface may be oriented in one direction, e.g., toward the bottom end or the top end of the housing 12. The shoulders may have a curved face with a radius of curvature that is equal to or greater than the radius of curvature of the rebar member or other reinforcing member that the should and the receiving member are configured to receive. It will be appreciated that although a curved shoulder is described, the present disclosure encompasses other shapes.

In some embodiments, the receiving members 26, 28 are provided to resiliently receive a section of rebar. For example, lids 10 of the present disclosure that are provided to receive #3 rebar are contemplated as comprising receiving members 26, 28 that comprise a receiving volume with a width of approximately 9.50 mm. In other words, the width of the receiving volume is less than the width of the rebar member. This dimension is contemplated as being modified for lids in which is desirable to use different rebar members. In some embodiments, at least a portion of the receiving members are provided as resilient or elastic portions that are operable to deflect to receive a rebar member and to contract after insertion of the rebar in order to engage and secure the rebar member. While various embodiments of the present disclosure contemplate a device that is operable to receive rebar, and devices that comprise rebar, various materials in addition to or in lieu of rebar are contemplated. For example, in some embodiments, rebar members are substituted with fiberglass members, reinforced plastic members or rods, steel bars (other than rebar), carbon fiber rods or trusses, aluminum members or rods, and other similar reinforcing materials.

As shown in FIGS. 2-3, lids 10 of the present disclosure provide a structure with first receiving members 26, 28 that secure rebar as well as properly orienting and aligning rebar members. For example, the first receiving members 26, 28 provided in the embodiment of FIGS. 2-3 provide a structure for positioning a pair of rebar members 20b extending along a length dimension of the lid 10 and four rebar members 20a extending along a width dimension of the lid 10. It will be recognized that various different arrangements are contemplated. For example, the lid 10 may comprise receiving members 26, 28 for greater or fewer than six rebar members. Additionally, the orientation and positioning of the rebar members 18, 20 may be altered.

As further shown in FIGS. 2-3, an interior portion of the housing 12 comprises second receiving members 30, 32 for receiving distal ends of rebar members. In one example, one receiving member 32 is positioned at a first location on the inner surface of one sidewall 13 of the housing 12, and another receiving member 32 is positioned at a second location on the inner surface of another sidewall 13. The first and second locations define an inner diameter of the housing 12, in this case the width of the housing 12, and the length of the rebar is substantially the same as the inner diameter. Thus, when assembled, the rebar reinforce the sidewalls 13 and maintain the shape of the housing 12. As shown in FIG. 3 each receiving member 32 also has a shoulder 33 that defines a receiving volume 35. In this embodiment, the shoulder 33 is oriented toward a bottom end of the housing 12, but it will be appreciated that the shoulder 33 may have any number of orientations.

In the depicted embodiment, second receiving members 30, 32 are provided as inversely oriented members relative to the first receiving members 26, 28 with which they are to cooperate. Stated differently, the shoulders of the first receiving members 26, 28 are oriented toward a first end of the housing 12, and the shoulders of the second receiving members 30, 32 are oriented toward a second, opposing end of the housing 12. Accordingly, and as shown in FIGS. 2-3, rebar members 20a are bounded on an upper and lower portion by receiving members 28, 32, and additional rebar members 20b are bounded on an upper and lower portion by receiving members 26, 30 such that the rebar members are secured or maintained within the lid even prior to pouring a concrete portion intended to surround and encases the rebar members.

In preferred embodiments, rebar members are intended to be provided in a centralized manner within an internal volume of the lid 10. However, as perpendicularly disposed rebar members will necessarily be "stacked" relative to one another, various embodiments of the present disclosure contemplate that at least one of the width-wise extending rebar members and the length-wise extending rebar members are not provided in the exact center of the height of the lid. Rather, the rebar members should be generally centered such that they are recessed relative to upper and lower surfaces of the concrete after pouring of the same.

Figure 4A:
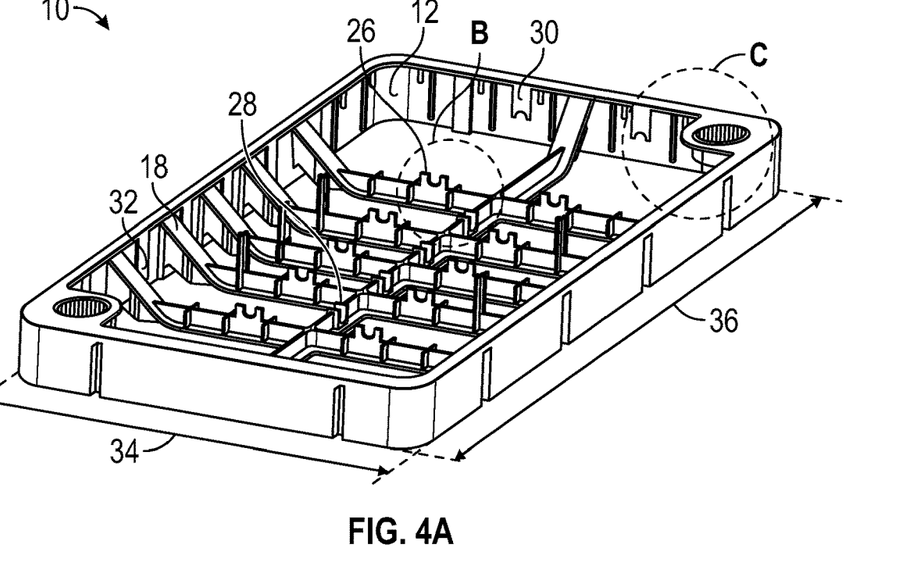
FIG. 4A is a top perspective view of a portion of a lid according to one embodiment of the present disclosure.
Figure 4B:
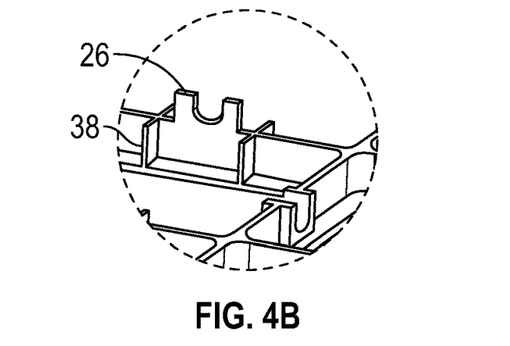
FIG. 4B is a detailed perspective of a portion of the lid shown in FIG. 4A.
Figure 4C:
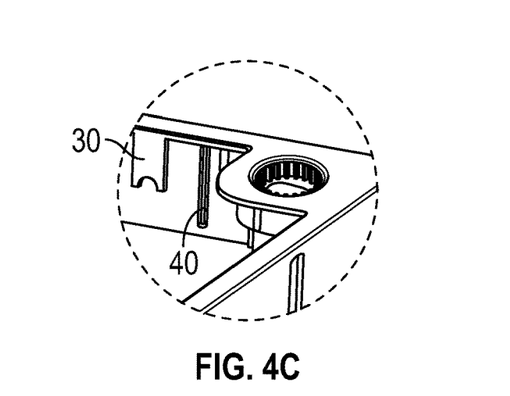
FIG. 4C is a detailed perspective of a portion of the lid shown in FIG. 4A.
Figure 5A:
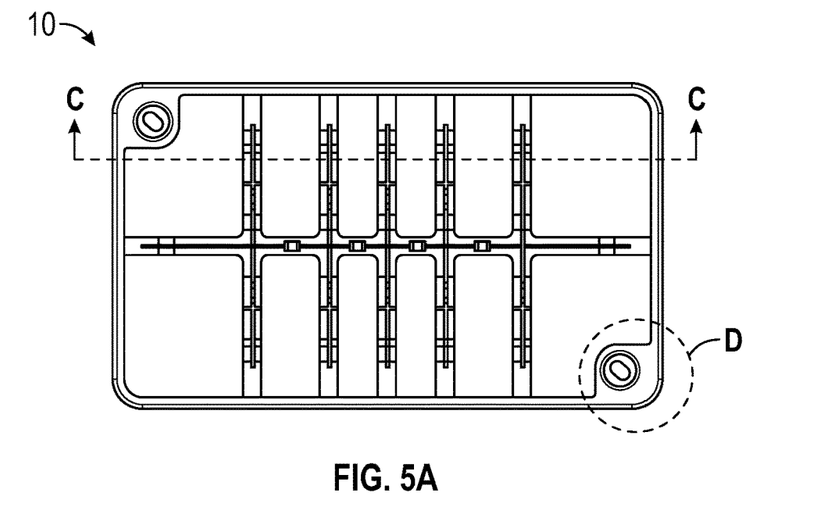
FIG. 5A is a top plan view of a portion of a lid according to one embodiment of the present disclosure.
Figure 5B:
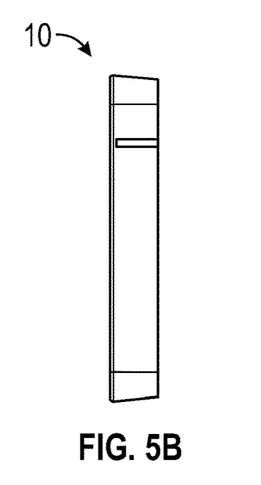
FIG. 5B is a side view of the lid portion of FIG. 5A.
Figure 5C:
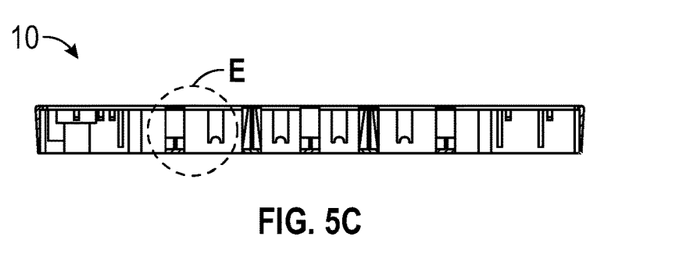
FIG. 5C is a cross-sectional elevation view of the lid portion of FIG. 5A.
Figure 5D:
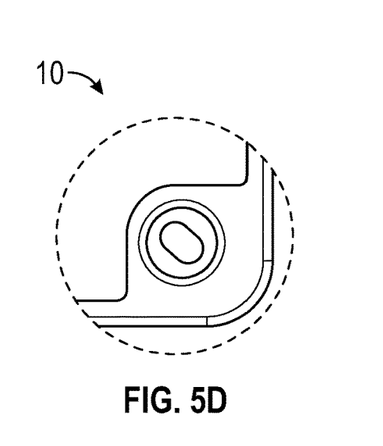
FIG. 5D is a detailed plan view of an area of the lid portion shown in FIG. 5A.
Figure 5E:
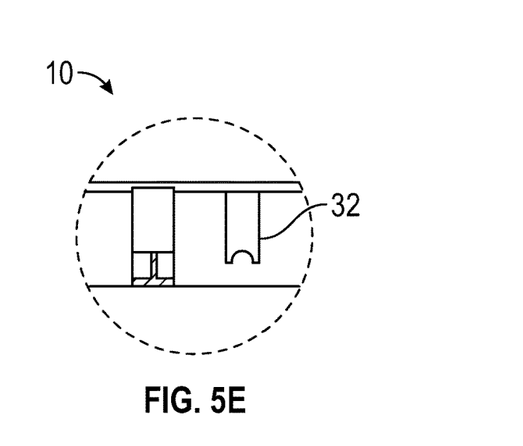
FIG. 5E is a detailed cross-sectional perspective view of a portion of FIG. 5C.

FIG. 4A is a top perspective view of a lid 10 according to one embodiment of the present disclosure. FIG. 4B is a detailed view of area B shown in FIG. 4A. FIG. 4C is a detailed view of area C shown in FIG. 4A. As shown in FIGS. 4A-4C, the lid 10 comprises an internal reinforcement member 18 with a plurality of upwardly-open slots 26 operable to receive rebar members extending along a width direction 34. The lid 10 further comprises a plurality of upwardly-open slots 28 operable to receive rebar members extending along a length direction 36. Additionally, an internal wall surface of the housing 12 comprises downwardly-open slots 30, 32 that correspond with respective upwardly open slots to engage and retain rebar members.

As shown in FIGS. 4A-4B, the internal reinforcement member 18 further comprises a plurality of projections 38. The projections 38 are operable to increase a contact surface area between the lid 10 and a quantity of concrete to be poured within the lid, thereby increasing structural integrity of the finished product and reducing spalling of concrete along contact points with the lid 10. Similarly, and as shown in FIG. 4C, an internal surface of the housing 12 comprises surface features 40 (e.g. projections or ridges) to enhance contact and connection between the lid 10 and the concrete.

FIG. 5A-5E are top, side and detailed views of a lid 10 according to one embodiment of the present disclosure. These additional views are provides to illustrate a lid 10 according to one embodiment of the present disclosure. Various alternative dimensions and proportions are contemplated.

Figure 6:
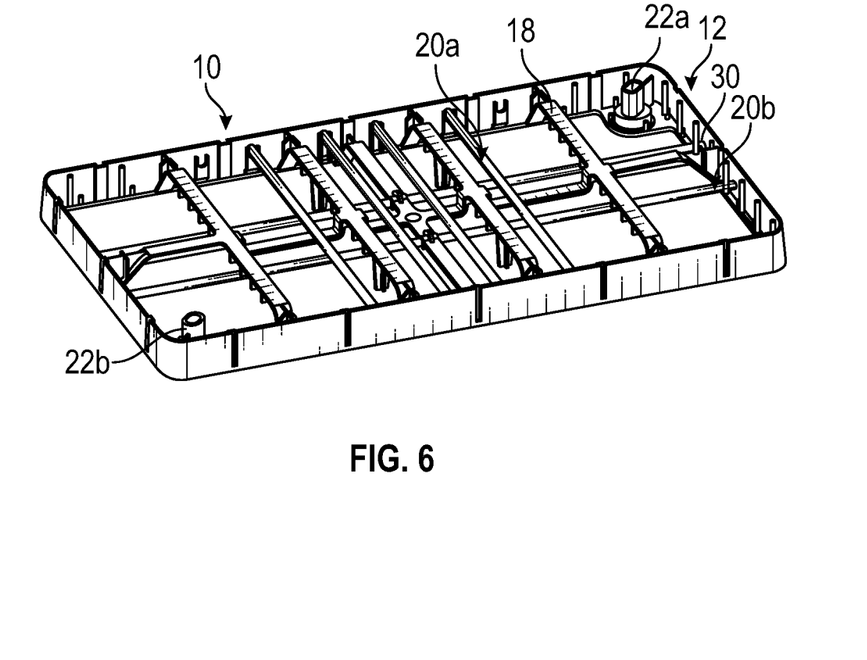
FIG. 6 is a perspective view of a lid according to another embodiment of the present disclosure.

FIG. 6 is a perspective view of the lid 10 according to the embodiment of FIG. 3. FIG. 6 provides a bottom perspective view of the lid 10 whereas FIG. 3 provides a top perspective view. Various features shown and described with respect to FIG. 3 are also provided in FIG. 6.

Figure 7:
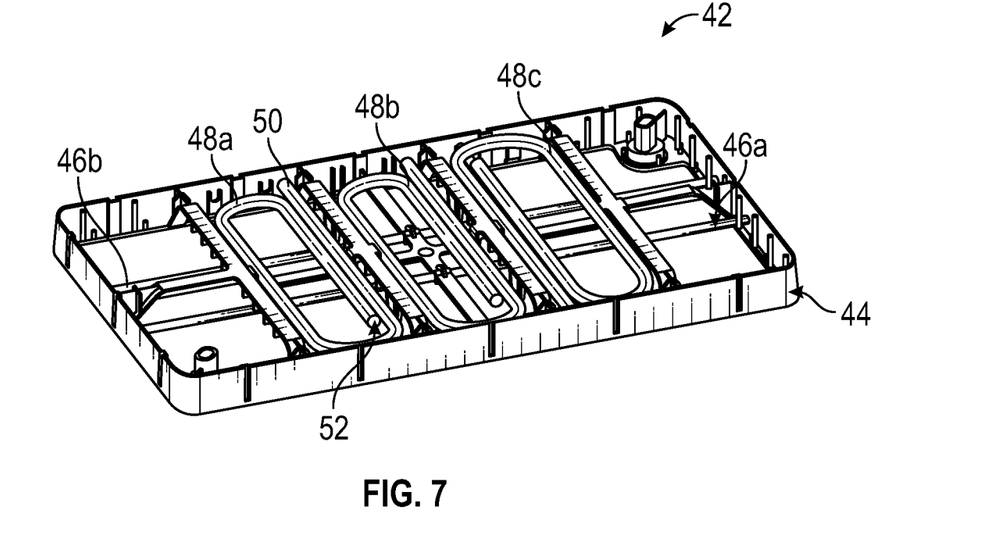
FIG. 7 is a perspective view of the lid according to the embodiment of FIG. 6 and with additional reinforcement features provided therein.

FIG. 7 is a bottom perspective view of a lid 42 according to another embodiment of the present disclosure. As shown, the lid 42 comprises a ring or housing 44 of essentially the same construction as that shown in FIG. 6. The housing 44 surrounds and at least partially defines an interior volume that is operable to receive concrete. As shown, the lid 42 comprises first and second 46a, 46b longitudinally extending rebar members. Additionally, the lid 42 is provided with at least one and preferably a plurality of bent rebar members 48a, 48b, 48c. Each of the members 48a, 48b, 48c comprise a single piece of rebar that is bent or curved into the shape and arrangement shown in FIG. 7. As shown, the members 48a, 48b, 48c comprise a first end 50 and a second end 52 and an initial length extending therebetween. The initial length comprises a length of the rebar member prior to bending. The initial length comprises a length that is approximately three times the width of the lid 42. The members 48a, 48b, 48c are bent or coiled in the arrangement shown in FIG. 7 with opposing curved portions at opposing sides of the housing 44, and wherein the first and second ends 50, 52 are also provided at substantially opposite sides of the housing 44. The members 48a, 48b, 48c provide for enhanced structural integrity of the lid 42 and concrete to be provided therein.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A lid for a utilities vault, comprising:
   a substantially planar cover having a perimeter edge;
   a housing at least partially defined by at least one sidewall extending from said perimeter edge of said planar cover, said housing having an upper end and a lower end, and said at least one sidewall having an inner surface with a first location and a second location that define an inner diameter of said housing;
   a first receiving member extending inward from said inner surface at said first location, said first receiving member having a first shoulder face oriented towards said lower end of said housing;
   a second receiving member extending inward from said inner surface at said second location, said second receiving member having a second shoulder face oriented towards said lower end of said housing; and
   a rebar member positioned between said upper end and said lower end of said housing, said rebar member having a first end positioned on said first shoulder face and a second end positioned on said second shoulder face, said rebar member having a length that is substantially the same as said inner diameter of said housing to reinforce said at least one sidewall.

2. The lid of claim 1, further comprising:
   a reinforcement structure extending between two sidewalls of said at least one sidewall, wherein said reinforcement structure has a third receiving member having a third shoulder face oriented towards said upper end of said housing, wherein said rebar member is positioned on said third shoulder face.

3. The lid of claim 1, wherein said at least one sidewall comprises a first sidewall and a second sidewall, wherein said first location and said first receiving member are positioned on said first sidewall, and said second location and said second receiving member are positioned on said second sidewall.

4. The lid of claim 3, further comprising:
   a third sidewall and a fourth sidewall of said at least one sidewall, wherein said third sidewall has a third location and said fourth sidewall has a fourth location, and said third location and said fourth location define a second inner diameter of said housing;
   a third receiving member extending inward from said inner surface at said third location, said third receiving member having a third shoulder face oriented towards said lower end of said housing;
   a fourth receiving member extending inward from said inner surface at said fourth location, said fourth receiving member having a fourth shoulder face oriented towards said lower end of said housing; and
   a second rebar member positioned between said upper end and said lower end of said housing, and said second rebar member having one end positioned on said third shoulder face and another end positioned on said fourth shoulder face, and a length of said second rebar member is substantially the same as said second inner diameter of said housing to reinforce said at least one sidewall.

5. The lid of claim 4, wherein said rebar member and said second rebar member are oriented substantially perpendicular to each other, and wherein said inner diameter is a width of said housing, said second inner diameter is a length of said housing, and said length is greater than said width.

6. The lid of claim 4, further comprising a third rebar member having a length that is longer than said inner diameter of said housing, wherein said third rebar member has at least one bend along said length of said third rebar member, and said third rebar member is positioned between said upper end and said lower end of said housing.

7. The lid of claim 1, wherein said length of said rebar member and said inner diameter of said housing have a less than 2% relative difference.

8. The lid of claim 1, further comprising:

a cementitious material positioned between said upper end and said lower end of said housing, wherein said first receiving member, said second receiving member, and said rebar member are embedded in said cementitious material.

9. A lid for a utilities vault, comprising:

a housing defined by a first sidewall and a second sidewall that extend from an upper end to a lower end of said housing, wherein said housing has an interior shoulder positioned on each of said first and second sidewalls with a geometric profile that receives a rebar member;

said rebar member having one end positioned on said interior shoulder of said first sidewall and another end positioned on said interior shoulder of said second sidewall;

a cover interconnected to said upper end of said housing, wherein said cover and said housing define an internal volume; and a fill material positioned in said internal volume, wherein said rebar member is embedded in said fill material to reinforce said first sidewall and said second sidewall.

10. The lid of claim 9, wherein said geometric profile of said interior shoulder of said first and second sidewalls defines a volume that at least partially receives a cross-section of said rebar member.

11. The lid of claim 9, wherein said geometric profile of said interior shoulder of said first and second sidewalls is oriented toward said lower end of said housing.

12. The lid of claim 9, wherein said geometric profile of said interior shoulder of said first and second sidewalls is a curved surface having a radius of curvature that is equal to or greater than a radius of a cross-section of said rebar member.

13. The lid of claim 9, further comprising:

a reinforcement structure having a plurality of ribs extending between said first sidewall and said second sidewall, wherein said reinforcement structure has an interior shoulder with a geometric profile that receives said rebar member.

14. The lid of claim 13, wherein said reinforcement structure has a longitudinal rib that is substantially perpendicular to said plurality of ribs, and said interior shoulder is positioned on said longitudinal rib.

15. The lid of claim 13, wherein said first sidewall, said second sidewall, and said reinforcement structure are a continuous structure.

16. The lid of claim 13, wherein said first sidewall, said second sidewall, and said reinforcement structure are a plastic material.

17. The lid of claim 9, wherein said fill material is at least of a cementitious material, a plastic material, or an insulation material.

* * * * *